US006951318B1

(12) United States Patent
Petersen et al.

(10) Patent No.: US 6,951,318 B1
(45) Date of Patent: Oct. 4, 2005

(54) MULTI-POSITION AIRCRAFT SERVICING PIT LID LATCH

(75) Inventors: Craig Petersen, Costa Mesa, CA (US); Dennis Hernandez, Costa Mesa, CA (US)

(73) Assignee: Dabico, Inc., Costa Mesa, CA (US)

( * ) Notice: Subject to any disclaimer, the term of this patent is extended or adjusted under 35 U.S.C. 154(b) by 83 days.

(21) Appl. No.: 10/614,507

(22) Filed: Jul. 2, 2003

(51) Int. Cl.[7] ..................... B64F 1/00
(52) U.S. Cl. ..................... 244/114 R; 220/315
(58) Field of Search ..................... 244/114 R; 220/315, 220/324; 49/394, 449, 503

(56) References Cited

U.S. PATENT DOCUMENTS

| | | | | |
|---|---|---|---|---|
| 945,753 | A | 1/1910 | Chamberlain et al. | |
| 1,923,481 | A | 6/1931 | Ford | |
| 1,915,297 | A * | 6/1933 | Cuntz | 244/114 R |
| 2,009,132 | A | 7/1935 | Gehris | |
| 3,166,007 | A * | 1/1965 | Hawley et al. | 100/219 |
| 3,591,143 | A * | 7/1971 | Boller | 254/119 |
| 4,467,932 | A | 8/1984 | Dabich | |
| 4,535,908 | A * | 8/1985 | Dabich | 220/484 |
| 4,669,625 | A * | 6/1987 | Armstrong | 220/484 |
| 4,739,896 | A * | 4/1988 | Moss | 52/169.6 |
| 5,082,392 | A | 1/1992 | Marchese et al. | |
| 5,465,862 | A * | 11/1995 | Devlin | 220/830 |
| 5,673,810 | A * | 10/1997 | Rothrock | 220/264 |
| 5,775,746 | A * | 7/1998 | Charlton | 292/219 |
| 5,950,368 | A * | 9/1999 | Bradford | 52/20 |
| 6,041,553 | A * | 3/2000 | Joyce et al. | 49/504 |
| 6,109,823 | A | 8/2000 | Halferty et al. | |
| 6,170,691 | B1 * | 1/2001 | Morris et al. | 220/304 |
| 6,199,414 | B1 * | 3/2001 | Chang | 70/168 |
| 6,715,715 | B1 * | 4/2004 | Petersen | 244/114 R |
| 6,749,363 | B1 * | 6/2004 | Petersen | 404/25 |

* cited by examiner

*Primary Examiner*—Tien Dinh
(74) *Attorney, Agent, or Firm*—Charles H. Thomas

(57) ABSTRACT

A multi-position latch mechanism is provided for a subsurface aircraft ground servicing chamber formed by a pit having an upright interior wall and a pit lid seat disposed atop the pit. A pit lid is provided which, when closed, rests upon the pit lid seat. The latch mechanism includes a catch member depending from the pit lid adjacent the upright wall of the pit. The catch member is mounted to the pit lid for rotatable movement relative thereto. A latching member is mounted on the upright interior pit wall and has a plurality of vertically spaced teeth that face the catch member. The catch member has a hook facing the latching member. The hook is alternatively engageable with each of the teeth, depending upon the extent to which debris on the pit lid seat holds the pit lid off of its pit lid seat.

7 Claims, 5 Drawing Sheets

MULTI-POSITION AIRCRAFT SERVICING PIT LID LATCH

BACKGROUND OF THE INVENTION

1. Field of the Invention

The present invention relates to a multi-position latching or fastening mechanism for an access lid to a buried pit forming a subsurface chamber for servicing aircraft.

2. Description of the Prior Art

At most modern aircraft terminals the servicing of aircraft on the ground is frequently performed using subsurface pits, which frequently are prefabricated structures. Such aircraft servicing pits are installed at aircraft docking, fueling, and loading areas beneath the surface of the tarmac across which aircraft on the ground travel during docking and departure maneuvers. The pits forming such subsurface chambers are typically constructed of fiberglass, steel, concrete, or aluminum. These pits are typically fabricated as complete enclosures with surrounding walls, sometimes a floor, and an access lid at the top seated within a frame disposed about the neck of the prefabricated pit. When the lid is closed it lies substantially flush with the surface of the surrounding tarmac. Such pits are installed below grade loading and refueling aprons at aircraft terminals, remote parking locations, and aircraft maintenance bases.

The purpose of these aircraft servicing pits is to allow ground support functions to be carried out from subsurface enclosures. These ground support functions include the provision of fuel, the provision of electricity to the aircraft while it is in the docking area, the provision of air for cooling the aircraft interior, the provision of pressurized air for starting the aircraft engines, and for other support activities for aircraft while they are on the ground. The use of subsurface pits eliminates the need for mobile trucks, carts, and other vehicles which are otherwise present in the loading area and which interfere with the arrival and departure of aircraft in the vicinity of a loading gate.

The use of subsurface pits also allows the provision of fuel, power, cooling and pressurized air, and other supplies from a central location. The necessary fluid supplies and electrical power can be generated or stored with a greater efficiency at a central location, as contrasted with mobile generating or supply vehicles.

The pits located below the aircraft terminal area house valves, junction boxes, cooling air terminations, and other terminal equipment that is temporarily connected to an aircraft that has been docked. Umbilical pipes and lines, otherwise housed within the pits, are withdrawn from them through hatches therein and are coupled to a docked aircraft to supply it with fuel, air for cooling the aircraft interior, pressurized air for starting the engines, and electrical power.

The pits are constructed with either hinged or totally removable lids that can be moved between open positions allowing access to the pits and closed positions which are flush with the surrounding surfaces of the docking, loading, or refueling areas across which aircraft travel and beneath which the pits are mounted. To ensure that the pit lids remain nearly level with the surrounding surfaces it is desirable to employ a pit lid latching mechanism. Very typically such a latching mechanism involves a catch depending from the underside of the edge of the pit lid remote from a hinge about which the pit lid is rotatably mounted to its surrounding frame. The catch engages a latch bar secured to an upright interior wall of the pit. The catch is normally moved in rotation about a horizontal axis by means of a lever arm which may be located in a cavity at the underside of the pit lid remote from the axis at which the pit lid is mounted to the frame. Access to this cavity to operate the latch mechanism is normally provided by a gap between the frame and the pit lid adjacent the lever arm. In other types of latching mechanisms different devices are employed to disengage the catch from the latch bar.

One problem that occurs not infrequently with conventional latch mechanisms is that dirt and other runway debris may collect in the seat upon which the pit lid rests. As a consequence, when the pit lid is opened for access to the aircraft servicing equipment or for access to lines located within a subsurface chamber, the debris spreads onto the surface of the pit lid seat upon which the pit lid normally rests. The thickness of this dirt and debris is sometimes sufficient to prevent the pit lid from seating flush against the pit lid seat when the lid is closed again. As a result, the additional thickness of the dirt and runway debris beneath the peripheral edge of the pit lid prevents the catch of the latch mechanism from depending downwardly far enough into the enclosure to engage the latch bar. When this occurs the pit lid will close, but is not latched tightly shut.

Various undesirable conditions can result if an aircraft servicing pit lid is not latched shut. The failure of the catch to engage the latch bar results in a failure to engage watertight seals that are often provided about the periphery of the pit lid. As a consequence, rain and melting snow will wash dirt and debris down into the pit thereby fouling the equipment located within the pit. An even more dangerous situation exists when a jet aircraft passes near a pit with an unlatched lid. The blast from a jet engine can easily blow open a pit lid that is not fully closed and properly latched. When this occurs an aircraft traveling across the surface beneath which the pit is located can damage its landing gear if it rolls across an open pit mouth.

SUMMARY OF THE INVENTION

One object of the present invention is to provide a secure latching system for an aircraft servicing pit lid that will engage even if some dirt or debris has collected on the pit lid seat. By ensuring engagement of the catch depending from the underside of the pit lid with the latch member located within the pit, the adverse consequences of an unlatched pit lid, previously described, are avoided.

Furthermore, the secure latching arrangement of the present invention makes it easier to close and latch the pit lid since the latching mechanism of the invention provides a plurality of sequentially engaged latch points.

In one broad aspect the present invention may be considered to be an improvement in an aircraft servicing pit latch mechanism for holding and releasing a pit lid removably mounted atop a subsurface aircraft servicing pit. The pit lid has an upper surface and an undersurface and the pit has an upright interior wall. A catch member depends from the underside of the pit lid and is mounted for rotational movement relative thereto about a catch member axis. A latch member is located on the upright wall adjacent the catch member and is engageable therewith. According to the improvement of the invention, one of the catch and latch members is provided with a plurality of vertically spaced teeth alternatively and selectively engageable by the other of the catch and latch members.

While the multiple, vertically spaced teeth may be provided on either the catch member that hangs from the underside of the pit lid or the latch member that is fastened to the upright interior wall of the pit, it is preferably the latch member on the pit wall that is provided with the plurality of teeth. Preferably, at least three vertically spaced teeth are provided.

In another aspect the invention may be considered to be a latch mechanism for a subsurface aircraft ground servicing chamber formed by a pit having an upright interior wall and a pit lid removably disposed atop the pit. The latch mechanism of the invention is comprised of a catch member depending from the pit lid adjacent the wall and mounted to the pit lid for rotatable movement relative thereto about a catch axis of rotation, and a latching member mounted on the pit wall and having a plurality of vertically spaced teeth thereon facing the catch member. The catch member has a hook facing the latching member. The hook is alternatively engageable with each of the teeth, depending upon the extent to which the pit lid is pressed downwardly toward the pit.

In still another aspect the invention may be considered to be an improvement in a latching mechanism for a pit having an upright interior wall and which is buried beneath a surface across which aircraft travel. The pit has a pit lid removably securable upon an upwardly facing seat atop the pit and above the interior wall. A catch having a hook is suspended from the pit lid and is mounted to the pit lid upon an axis for rotational movement toward and away from the pit wall. The improvement resides in a latch member having a plurality of vertically separated latching teeth directed toward the catch, and which is mounted upon the pit wall. The catch is selectively and alternatively engageable with each of the latching teeth, depending upon the extent to which the pit lid is forced downwardly upon the seat.

The invention may be described with greater clarity and particularity by reference to the accompanying drawings.

DESCRIPTION OF THE EMBODIMENTS

Figure 1:
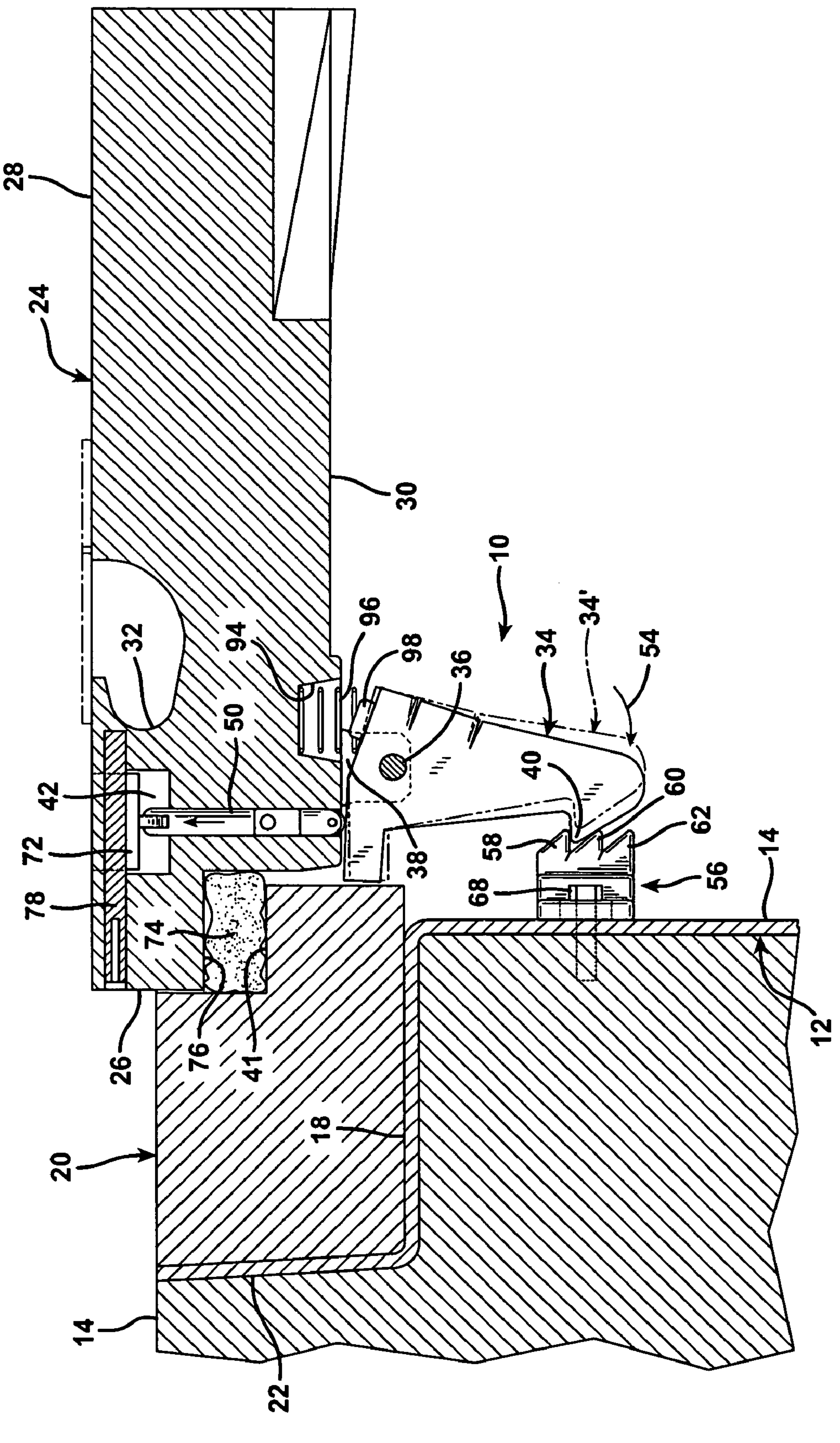
FIG. 1 is a side sectional elevational detail illustrating one embodiment according to the invention of a latch mechanism for a subsurface aircraft ground servicing chamber with the catch member engaged with the uppermost of three vertically spaced latching teeth.

FIG. 1 illustrates a latching mechanism 10 for an aircraft servicing pit 12 buried beneath a surface 14 across which aircraft travel. The aircraft servicing pit 12 is a prefabricated structure having an upright interior wall 14 that terminates at its upper extremity in an outwardly directed shelf 18 that supports a pit lid seating frame 20. A peripheral retaining wall 22 at the upper extremity of the prefabricated pit 12 surrounds the pit lid seating frame 20.

The mouth opening of the pit 12 is closed by a heavy aluminum or stainless steel pit lid 24 that is hinged at a hinged edge remote from its free edge 26 illustrated in FIG. 1. The pit lid 24 is thereby removably disposed atop the pit 12.

The pit lid 24 has an undersurface 30 and an upper surface 28, which ideally resides flush with the surrounding surface 14 beneath which the pit 12 is buried. The pit lid 24 has a concave handgrip 32 defined in its upper surface 28 which a user can grip to pull the pit lid 24 up and rotate it open about its hinged connection to the pit lid seating frame 20. This hinged connection is not shown in FIG. 1, but is conventional, as are the other structures of the prefabricated pit 12, the pit lid frame 20, and the pit lid 24. These conventional structures are described in greater detail in U.S. Pat. Nos. 4,467,932 and 4,739,896, both of which are hereby incorporated by reference in their entireties.

Figure 2:
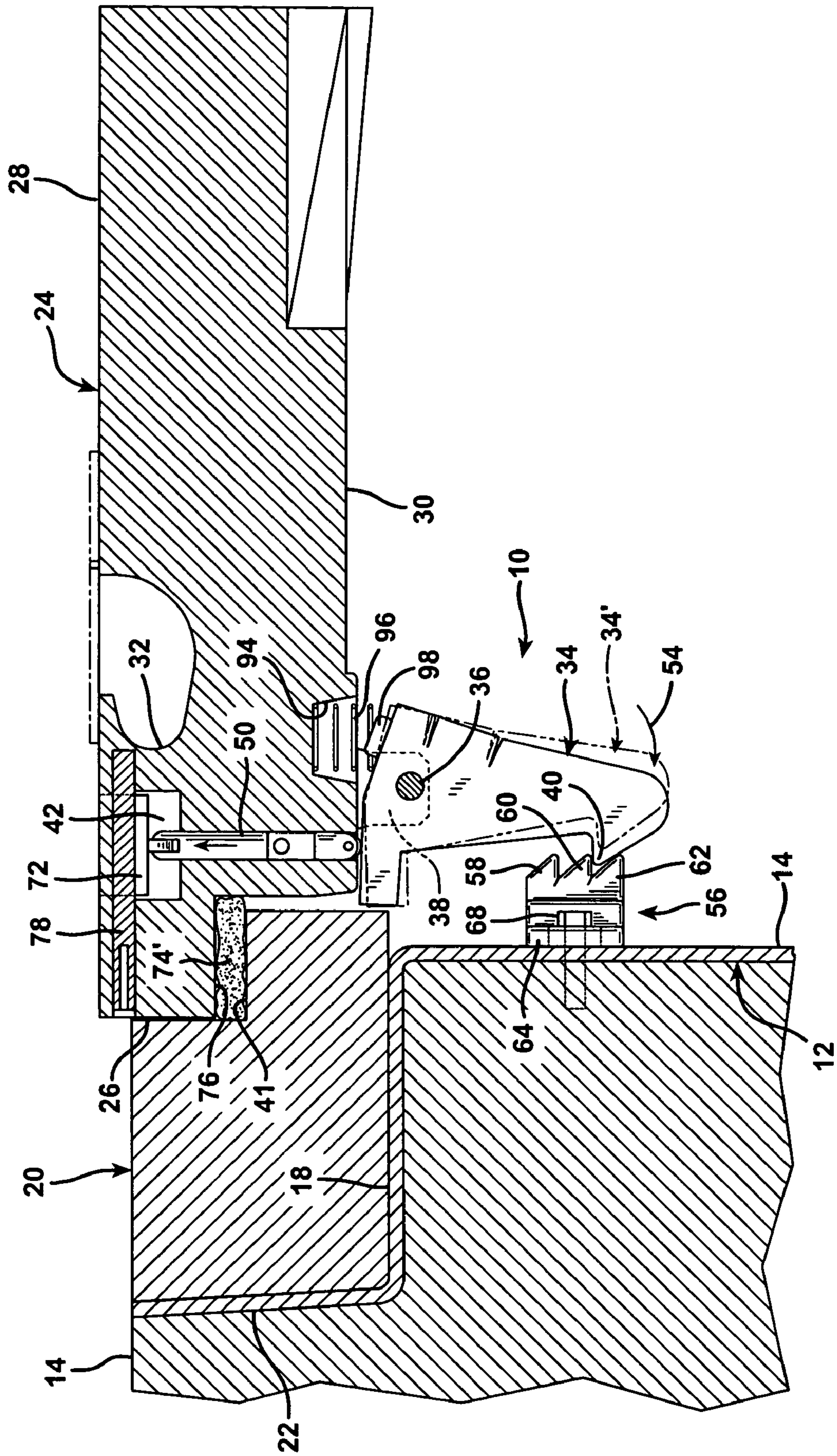
FIG. 2 illustrates the same embodiment of FIG. 1 with the catch engaged with the intermediate latch tooth.
Figure 3:
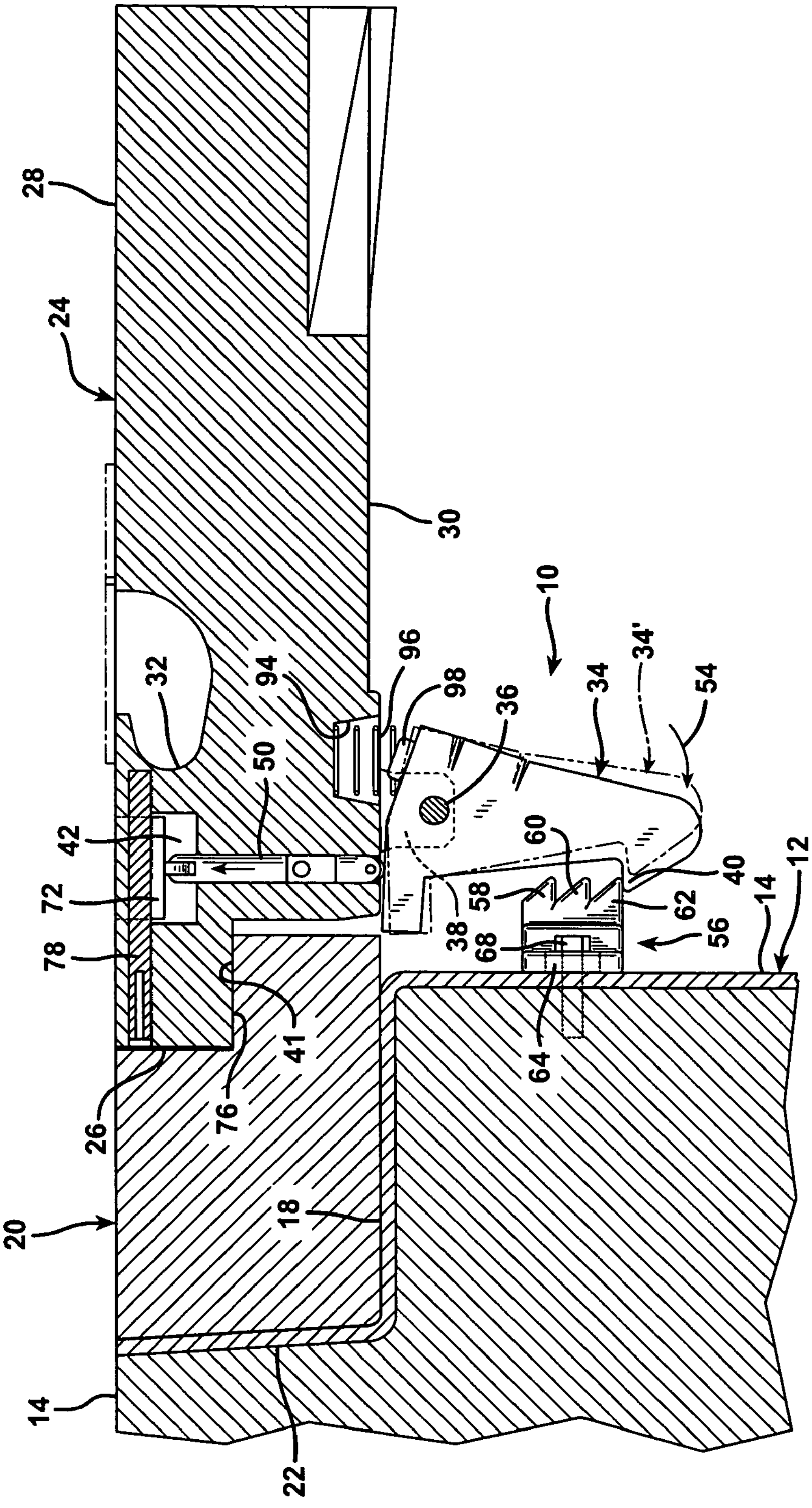
FIG. 3 illustrates the same embodiment of FIGS. 1 and 2 with the catch engaged with the lowermost latch tooth.

In the embodiment of the latch mechanism 10 illustrated in FIGS. 1–3 a catch member 34 depends from the pit lid 24 adjacent to the upright wall 14 and is mounted to the pit lid 24 by means of a catch mounting axle pin 36 that is held between a pair of depending ears 38. The catch axis of rotation is the axis of the catch mounting axle pin 36 which is normally parallel to both the upper surface 28 of the pit lid 24 and also the upright interior wall 14 of the pit 12.

The catch member 34 moves together with the catch axle pin 36 in rotational motion relative to the pit lid 24 and the upright wall 14 by means of an actuator rod 50 and an L-shaped actuator lever 72 that normally resides within a latch handle recess 44. The latch operating lever 72 is rotatably mounted to the pit lid 24 by means of a lever arm axle pin 78.

Preferably, the pit lid 10 is provided at its underside 30 with a shallow spring pocket 94 within which a coil spring 96 is disposed. The lower extremity of the spring 96 bears against the top of the catch 34 at a laterally spaced distance of separation from the catch mounting axle pin 36 and is stabilized about a rubber snubber 98 on the top of the catch 34. The coil spring 96 is compressed so as to exert a light force against the catch 34 in a clockwise direction as indicated at 54 in FIG. 1. The coil spring 96 thereby biases the catch member 34 toward a latch member 56 as illustrated.

Figure 4:
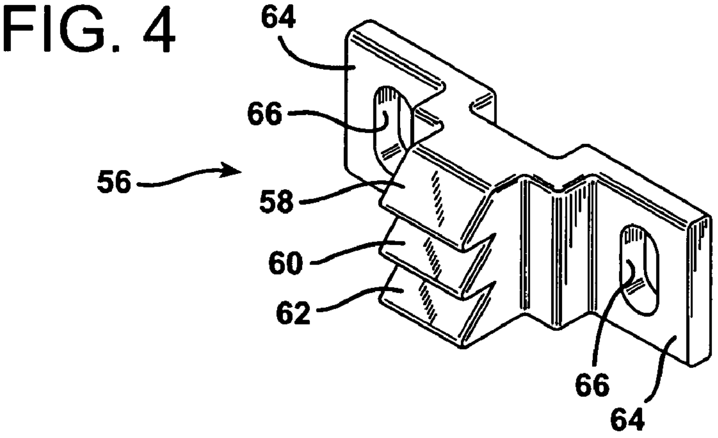
FIG. 4 is a perspective view illustrating in isolation the latch bar employed in the embodiment of FIGS. 1–3.

The latch member 56 is illustrated in detail and in isolation in FIG. 4. The latch member 56 has a central region that is provided with three downwardly inclined teeth 58, 60, and 62 that are aligned in vertical separation from each other. The latch member 56 includes a pair of mounting wings 64 projecting laterally from both sides of the vertical array of teeth 58, 60, and 62. Vertically elongated bolt openings 66 are defined in the mounting wings 64. The bolt openings 66 receive the shanks of latch bar mounting screws 68. The shanks of the mounting screws 68 are externally threaded and are engaged in openings in the upright wall 14 of the prefabricated pit 12. The heads of the bolts 68 thereby clamp the latch bar 56 tightly against the interior wall 14 of the aircraft servicing pit 12 at an elevation just below the pit lid seating frame 20. This elevation can be adjusted slightly within the limits allowed by the elongated lengths of the bolt openings 66 in the latch bar mounting wings 64.

In the operation of the latching mechanism of the invention the force of gravity will cause the latch operating lever 72 to drop into the latch operating lever storage recess 42 when the pit lid 24 is in the closed position, as shown in drawing FIGS. 1–3. The force of the coil spring 96 is sufficient to overcome the opposing force of the weight of the actuator rod 50 and thereby rotate the catch member 34 to one of the latched positions illustrated in FIGS. 1–3 so that the catch hook 40 engages the latch bar 56.

As illustrated in FIG. 1, not infrequently dirt and other runway debris, indicated at 74, will build up on the seating ledge 41 of the pit lid mounting frame 20. When this occurs the pit lid 24 cannot drop back completely flush with the surrounding surface 14, since the thickness of the dirt and runway debris 74 prevents the peripheral edge 76 of the pit lid 24 from descending into contact with the bearing ledge seat 41 formed by the pit lid frame 20. As a consequence, the extent to which the hook 40 of the catch 34 projects downwardly alongside the upright interior pit wall 14 is limited. When the dirt and runway debris 74 is of a substantial thickness, as illustrated in FIG. 1, the hook 40 can only engage the uppermost tooth 58 of the latch bar 56.

However, even though the upper surface 28 of the pit lid 24 is not quite flush with the surrounding surface 14 beneath which the aircraft service pit 12 is buried, the catch member 34 of the latching mechanism 10 is firmly engaged with the latch bar 56 due to the interengagement between the hook 40 and the uppermost latch bar tooth 58.

To disengage the latch hook 40, the user lifts upwardly on the latch operating lever 72 to rotate it about the pin 78 and pull its upper end out of the latch operating lever storage recess 42. There is sufficient space in the latch operating lever storage recess 42 adjacent the latch operating lever 72 to permit insertion of the fingers of one hand in order to grip the latch handle of the latch operating lever 72.

When the latch operating lever 72 is rotated upwardly it forces the catch member 34 from the engaged position illustrated in solid lines in FIG. 1 to the disengaged position illustrated in phantom at 34'. The hook 40 is then pulled clear of all of the teeth 58, 60, and 62. The user can than lift the pit lid 10 in rotation to open it by gripping it at the handgrip opening 32.

When the pit lid 10 is closed, it is simply dropped back into position. The force of gravity will cause the heavy pit lid 10 to seat in at least a generally horizontal disposition in the frame 20 as illustrated in the drawing figures. As the pit lid 10 descends, the inclined cam surface on the back of the catch hook 40 contacts the latch bar 56 and causes the catch 34 to counterrotate against the force of the coil spring 96 so as to allow the catch 34 to clear at least one of the teeth 58, 60, and 62 of the latch bar 56. Once the hook 40 has cleared the undersurface of any one of the teeth 58, 60, and 62 of the latch bar 56, the force of the coil spring 96 is sufficient to counterrotate the catch member 34 as indicated by the directional arrow 54 in FIGS. 1–3 to once again cause the catch member 34 to engage the latch bar 56.

As illustrated in FIGS. 1–3, the particular tooth 58, 60, or 62 of the latch bar 56 that will be engaged by the catch 34 is dependent upon the existence and thickness of any dirt or runway debris 74 on the pit lid seat 41. FIG. 2 illustrates a condition in which the amount of dirt and runway debris indicated at 74' is somewhat thinner than the amount of the corresponding debris 74 illustrated in FIG. 1. As a consequence, when the pit lid 24 is closed, the catch member 34 will depend slightly further into the subsurface pit chamber and the hook 40 will engage the intermediate tooth 60 of the latch bar 56 when the lid 24 is dropped back to a closed position.

On the other hand, if there is no debris whatsoever, or merely a negligible amount of debris atop the pit lid mounting seat 41, as illustrated in FIG. 3, the catch member 34 will engage the lowermost tooth 62 of the latching bar 56.

FIGS. 5 through 9 of the drawings illustrate another embodiment of the invention which also has a plurality of vertically spaced teeth to engage the catch mechanism 134. The catch mechanism 134 is a gravity operated pit lid latch of the type illustrated and described in U.S. Pat. No. 4,739,896. The catch mechanism 134 is the same as that of the prior '896 patent but the latch bar 156 has a different construction.

Figure 6:
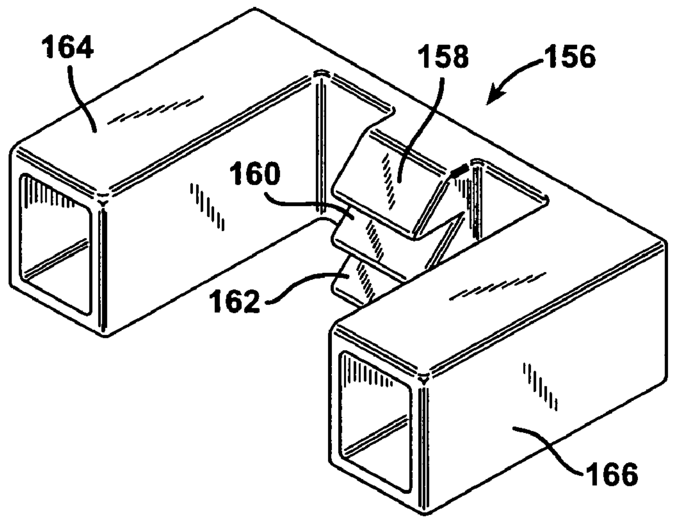
FIG. 6 is a perspective review illustrating, in isolation, the latch bar employed in the embodiment of the invention shown in FIG. 5.
Figure 7:
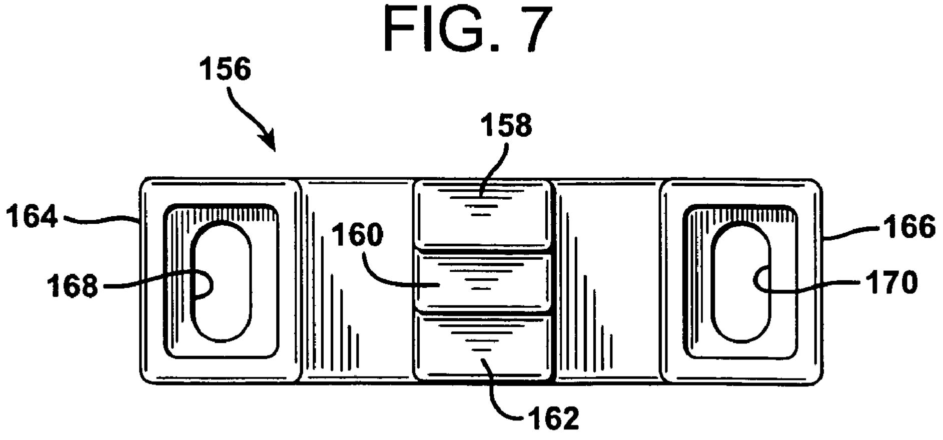
FIG. 7 is a front elevational view of the latch bar shown in FIG. 6.

As illustrated in FIG. 6, the latch member 156 has a central region that includes at least three vertically spaced teeth 158, 160, and 162. The central region of the latch member 156 is held in spaced separation from the upright interior wall 14 of the prefabricated pit 12 by a pair of laterally bracketing spacing posts 164 and 166. The spacing posts 164 and 166 have relatively large, square openings at their ends opposite the central structure bearing the teeth 158, 160, and 162. These square openings reside in contact with the interior pit wall 14. The spacing posts 164 and 166 have vertically elongated bolt openings 168 and 170 at their other ends on each side of the central structure bearing the vertically spaced teeth 158, 168, and 162.

The spacing posts 164 and 166 accommodate elongated fastening bolts 172 that can engage the same tapped openings in the upright wall 14 as the bolts 68 in the embodiment of FIGS. 1–3. Alternatively the pit 14 is sometimes formed with studs that are molded into the structure of the wall 14 and which project only a short distance into the pit cavity. Internally threaded barrel connectors may be employed to threadably engage these studs. In either case, the wall 14 of the pit 12 may alternatively accommodate either the latch plate 56 or the latch member 156. Thus, the pit 12 will accommodate use of different types of pit lids, including the pit lid 24 illustrated in FIGS. 1–3 as well as the pit lid 124 illustrated in FIG. 5.

Figure 5:
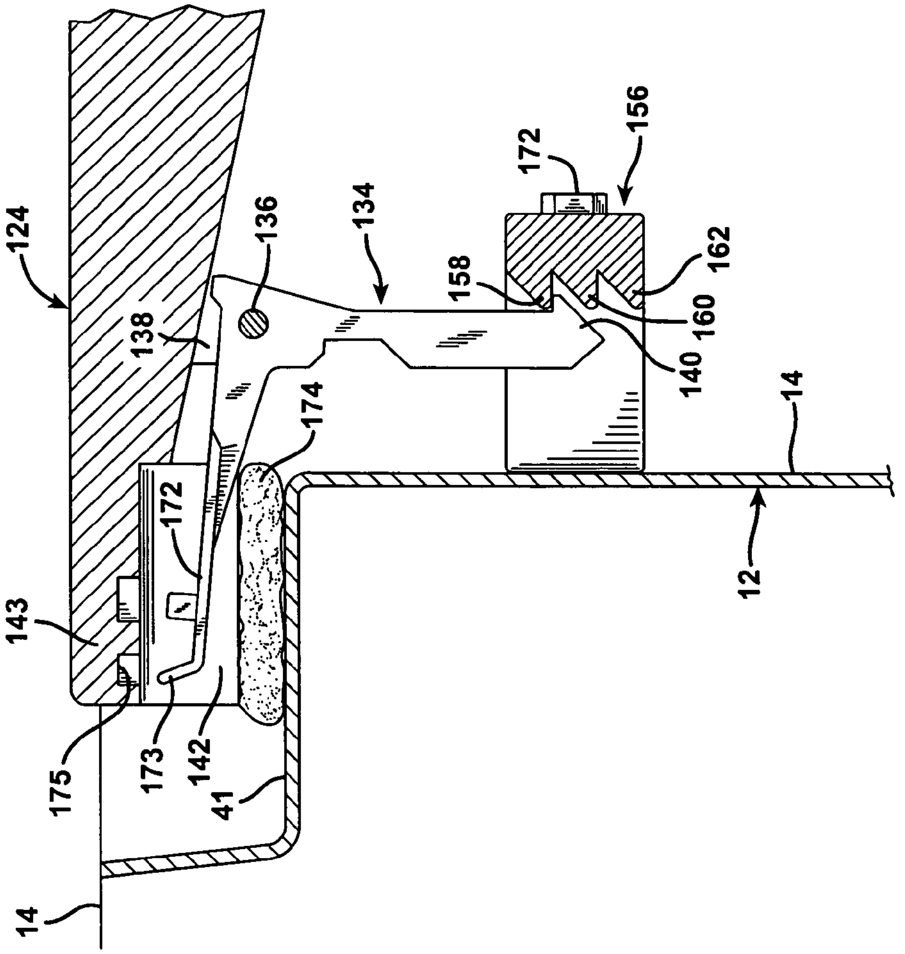
FIG. 5 is a side sectional elevational detail illustrating another embodiment of the invention latched in the uppermost of three positions.

As shown in drawing FIG. 5, the catch 134 has a long, finger-like depending structure near the end of which a hook 140 is formed. The catch 134 is mounted between a pair of depending ears 138 on a catch mounting rod 136. The catch 134 also has a lever arm 172 that projects radially outwardly from the catch mounting rod 136 into a cavity 142 located beneath the peripheral edge 143 of the pit lid 124. The distal tip 173 of the lever arm 172 remote from the catch mounting rod 136 is angled upwardly and is received into a concave recess 175 when the catch 134 is actuated to disengage the hook 140 from the latch member 156.

Unlike the latch mechanism illustrated in drawing FIGS. 1–3, the catch 134 is a gravity operated latch mechanism. The weight distribution of the structure of the catch 134 is such that the lever arm 172 will drop downwardly under the force of gravity, thereby rotating the hook 140 into engagement with one of the teeth 158, 160, or 162 of the latch member 156. To disengage the hook 140, the user inserts the fingers of one hand into the cavity 142 beneath the lever arm 172 and pushes the lever arm 172 upwardly. This draws the hook 140 out of engagement with the particular tooth 158, 160, or 162 with which it was engaged, and out of engaging relationship with respect to any of those teeth.

Figure 8:
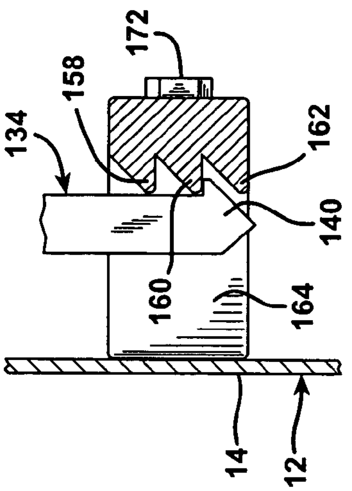
FIG. 8 is a side sectional elevational detail illustrating the catch of the embodiment of FIG. 5 engaged in the middle position.
Figure 9:
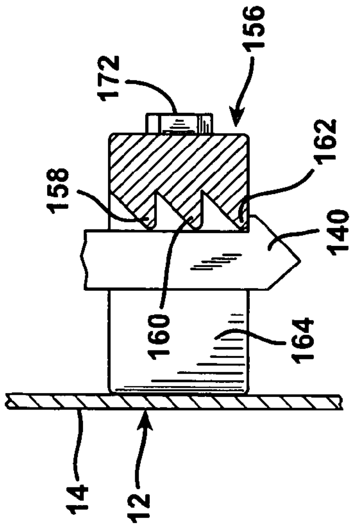
FIG. 9 is a side elevational detail illustrating the catch of the embodiment of FIG. 5 engaged in the lowermost position.

As with the other embodiment of the invention illustrated, the latch mechanism illustrated in FIGS. 5–9 provides alternative latching positions that ensure engagement of the catch 134 with the latch member 156 despite the presence of dirt and runway debris 174, as illustrated in FIG. 5. As shown in that drawing figure, if there is a considerable amount of debris 174, the thickness of that debris will prevent the pit lid 124 from residing flush with the surrounding surface 14 beneath which the pit 12 is buried. As a consequence, the hook 140 will project vertically downwardly only far enough down into the subsurface chamber to engage the uppermost tooth 158 of the latch member 156. If the thickness of the dirt and debris on the pit lid seat 18 is somewhat less, the hook 140 will reside at a slightly lower elevation and will then engage the middle tooth 160 of the three vertically spaced teeth of the latch member 156, as illustrated in FIG. 8. If little or no debris exists on the pit lid seat 41 the hook 140 will engage the lowermost tooth 162 on the latching member 156, as illustrated in FIG. 9.

Undoubtedly, numerous variations and modifications of the invention will become readily apparent to those familiar with subsurface aircraft servicing pit latch mechanisms. For example, in an equivalent variation of the embodiments of the invention illustrated in the drawing figures, the catches could each be provided with a plurality of vertically spaced hooks that would selectively and alternatively engage a single latch element on the latch member. Numerous other latch and catch mechanisms employing the principles of the invention are also possible. Accordingly, the scope of the invention should not be construed as limited to specific embodiments depicted and described, but rather is defined in the claims appended hereto.

We claim:

1. In an aircraft servicing pit latch mechanism for holding and releasing a pit lid removably mounted atop a subsurface aircraft servicing pit, wherein said pit lid has an upper surface and an undersurface and said pit has an upright wall, and including a catch member depending from said underside of said pit lid and mounted for rotational movement relative thereto about a catch member axis, and a latch member located on said upright wall adjacent said catch member and engageable therewith, the improvement wherein one of said catch and latch members is provided with a plurality of vertically spaced teeth alternatively and selectively engageable by the other of said catch and latch members, and further including a spring that biases said catch member toward engagement with said latch member and a lever mounted for rotational movement on said pit lid for disengaging said catch member from said latch member.

2. An aircraft servicing pit latch mechanism according to claim 1 wherein said one of said catch and latch members that is provided with said plurality of teeth is said latch member.

3. An aircraft servicing pit latch mechanism according to claim 1 comprising at least three of said vertically spaced teeth.

4. In a latching mechanism for a pit having an upright interior wall and buried beneath a surface across which aircraft travel and having a pit lid removably securable upon an upwardly facing seat atop said pit above said interior wall and in which a catch having a hook is suspended from said pit lid and mounted to said pit lid upon an axis for rotational movement toward and away from said pit wall, the improvement wherein a latch member having a plurality of vertically separated latching teeth directed toward said catch is mounted upon said pit wall, and further comprising a spring that biases said catch toward engagement with said latch member and a lever mounted for rotational movement on said pit lid for disengaging said catch from said latch member, whereby said catch is selectively and alternatively engageable with each of said latching teeth, depending upon the extent to which said pit lid is forced downwardly upon said seat.

5. A latching mechanism according to claim 4 comprising at least three of said vertically spaced teeth.

6. A latch mechanism for a subsurface aircraft ground servicing chamber formed by a pit having an upright interior wall and a pit lid removably disposed atop said pit comprising: a catch member depending from said pit lid adjacent said wall and mounted to said pit lid for rotatable movement relative thereto about a catch axis of rotation, and a latching member mounted on said pit wall and having a plurality of vertically spaced teeth thereon facing said catch member, and said catch member has a hook facing said latching member, and said hook is alternatively engageable with each of said teeth, depending upon the extent to which said pit lid is pressed downwardly toward said pit, and further comprising a biasing spring that urges said catch member toward engagement with said latching member and a lever mounted for rotational movement on said pit lid for disengaging said catch member from said latching member.

7. A latch mechanism according to claim 6 comprising at least three of said vertically spaced teeth.

* * * * *